United States Patent
Xu et al.

(10) Patent No.: US 12,556,369 B2
(45) Date of Patent: Feb. 17, 2026

(54) DATA MANAGEMENT SYSTEM, DATA MANAGEMENT METHOD, AND DATA MANAGEMENT PROGRAM

(71) Applicant: DENSO CORPORATION, Kariya (JP)

(72) Inventors: Xin Xu, Kariya (JP); Haolun Huang, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 61 days.

(21) Appl. No.: 18/480,375

(22) Filed: Oct. 3, 2023

(65) Prior Publication Data

US 2024/0031131 A1    Jan. 25, 2024

Related U.S. Application Data

(63) Continuation of application No. PCT/JP2022/013367, filed on Mar. 23, 2022.

(60) Provisional application No. 63/171,328, filed on Apr. 6, 2021.

(51) Int. Cl.
     *H04L 9/06*      (2006.01)
     *H04L 9/00*      (2022.01)
     *H04L 9/30*      (2006.01)

(52) U.S. Cl.
     CPC ............ *H04L 9/0643* (2013.01); *H04L 9/30* (2013.01); *H04L 9/50* (2022.05)

(58) Field of Classification Search
CPC . H04L 9/0643; H04L 9/30; H04L 9/50; H04L 2209/84; G06F 21/64
See application file for complete search history.

(56) References Cited

U.S. PATENT DOCUMENTS

| | | | | |
|---|---|---|---|---|
| 2017/0300912 A1* | 10/2017 | Narasimhan | ............ | H04L 63/08 |
| 2019/0258991 A1* | 8/2019 | Nguyen | ............... | H04L 9/0894 |
| 2020/0295947 A1* | 9/2020 | Young | ..................... | H04L 67/06 |
| 2020/0364150 A1* | 11/2020 | Breslow | ............. | G06F 12/1036 |

FOREIGN PATENT DOCUMENTS

| | | | | |
|---|---|---|---|---|
| CN | 112868042 A | * | 5/2021 | ............ G06Q 20/32 |
| JP | 2016-066012 A | | 4/2016 | |

OTHER PUBLICATIONS

Deepayan Bhowmik and Tian Feng, "The Multimedia Blockchain: A Distributed and Tamper-Proof Media Transaction Framework", 2017 22nd International Conference on Digital Signal Processing (DSP), IEEE, 2017.

Suayb S. Arslan and Turguy Goker, "Compress-Store on Blockchain: A Decentralized Data Processing and Immutable Storage for Multimedia Streaming", https://arxiv.org/abs/1905.10458v2, May 2019.

* cited by examiner

*Primary Examiner* — Mohammed Waliullah
(74) *Attorney, Agent, or Firm* — Maschoff Brennan

(57) ABSTRACT

A data management system includes a storage device storing a data relating to a target as an original data, and at least one node storing a blockchain. The at least one node includes a processor and a memory. The memory stores a computer readable instruction. When executed by the processor, the instruction causes the processor, when storing the original data, to select a hash function from a hash function list, acquire a hash value of the original data as an original hash value, and store the original hash value and a hash function identification information on the blockchain.

8 Claims, 8 Drawing Sheets

| DATA ATTRIBUTION | HASH FUNCTION |
|---|---|
| COMPRESSED DATA BY DCT/DWT | SHA-1 |
| PNG/JPEG (IMAGE) | SHA-256 |
| MP4/AVI/FLV (VIDEO) | SHA-256 |
| MP3/WAVE/AAC (AUDIO) | SHA-256 |
| PDF/WORD/PPT (SPECIAL DOCUMENT) | SHA-512 |
| TEXT | SHA-512 |

DATA MANAGEMENT SYSTEM, DATA MANAGEMENT METHOD, AND DATA MANAGEMENT PROGRAM

CROSS REFERENCE TO RELATED APPLICATION

The present application is a continuation application of International Patent Application No. PCT/JP2022/013367 filed on Mar. 23, 2022, which designated the U.S. and claims the benefit of priority from U.S. Provisional Application No. 63/171,328 filed on Apr. 6, 2021. The entire disclosures of all of the above applications are incorporated herein by reference.

TECHNICAL FIELD

The present disclosure relates a technique for managing data using a blockchain.

BACKGROUND

A related art discloses a management system for a multimedia data. The management system in the related art can detect tampering of a storage data by storing an edit history information of the storage data on a blockchain.

SUMMARY

According to an example, a data management system may include a storage device storing a data relating to a target as an original data, and at least one node storing a blockchain. The at least one node includes a processor and a memory. The memory stores a computer readable instruction. When executed by the processor, the instruction causes the processor, when storing the original data, to select a hash function from a hash function list, acquire a hash value of the original data as an original hash value, and store the original hash value and a hash function identification information on the blockchain.

DETAILED DESCRIPTION

Figure 1:
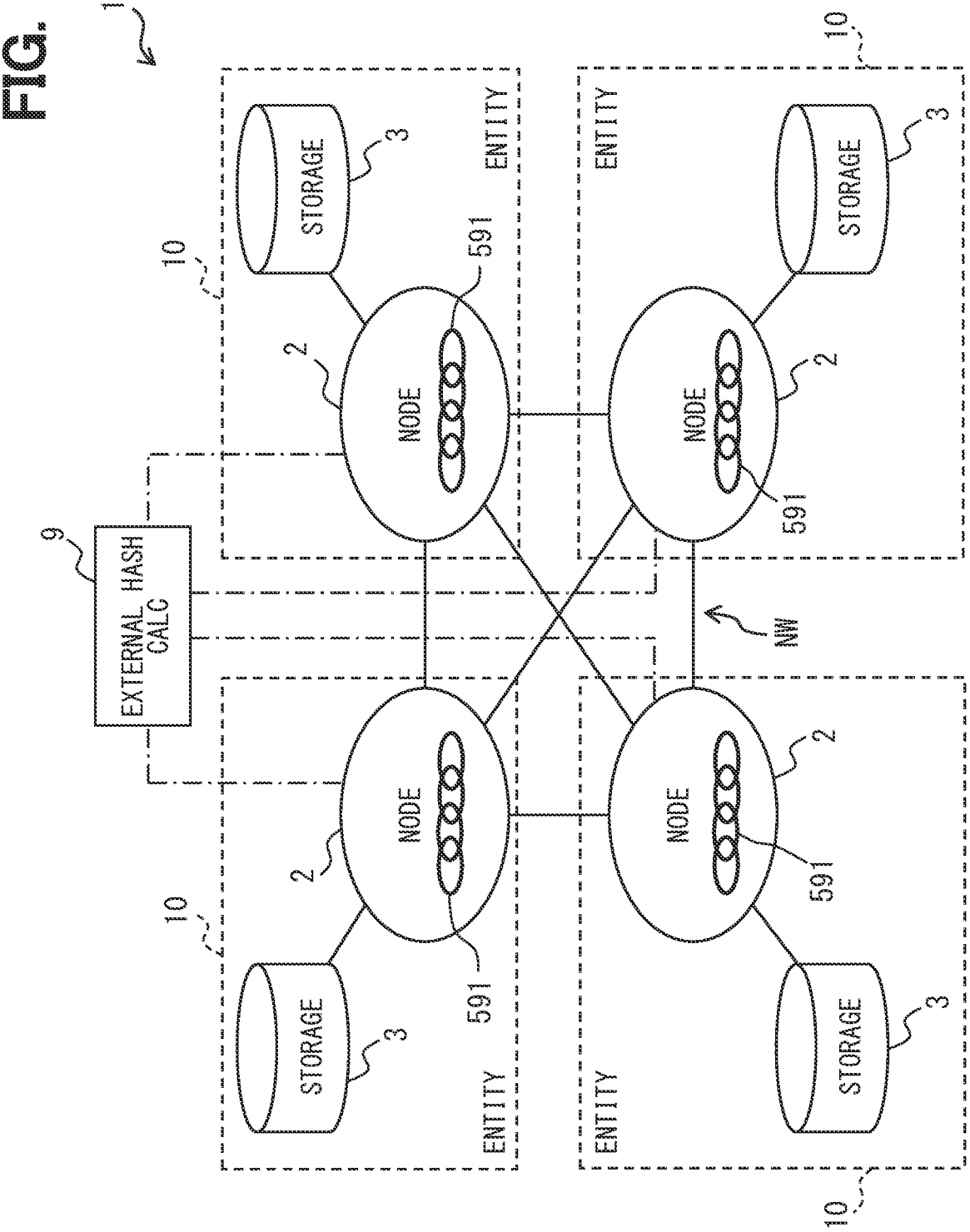
FIG. 1 is a diagram conceptually showing an overall data management system according to an embodiment of the present disclosure.

The inventors of the present disclosure have found the followings. A related art refers to verification of tampering performed when the storage data is provided. It may be difficult to efficiently verify the presence or absence of tampering.

According to one aspect of the present disclosure, a data management system capable of verifying whether a storage data is tampered with is provided. The data management system comprises a storage device that is configured to store a data relating to a target as an original data, and at least one node that is configured to store a blockchain recording an information relating to the original data. The at least one node includes a processor and a memory. The memory stores a computer readable instruction. When executed by the processor, the instruction causes the processor, when storing the original data, to select a hash function corresponding to an attribute of the original data from a hash function list in which various attributes of data and a plurality of hash functions corresponding to the various attributes of the data are associated, acquire a hash value of the original data as an original hash value using the hash function, which is selected, and store the original hash value and a hash function identification information on the blockchain, the hash function identification information identifying the hash function selected.

According to another aspect of the present disclosure, a data management method capable of verify whether or not a storage data is tampered with is provided. The method comprises: storing a data relating to a target as an original data in a storage device; selecting a hash function corresponding to an attribute of the original data from a hash function list in which various attributes of data and a plurality of hash functions corresponding to the various attributes of the data are associated; acquiring a hash value of the original data as an original hash value using the hash function, which is selected; and storing the original hash value and a hash function identification information on the blockchain, the hash function identification information identifying the hash function selected.

According to another aspect of the present disclosure, a non-transitory computer readable storage medium storing a program including an instruction is provided. When the instruction is executed by at least one processor, the instruction causes the at least one processor, when storing data, to store a data relating to a target as an original data in a storage device, select a hash function corresponding to an attribute of the original data from a hash function list in which various attributes of data and a plurality of hash functions corresponding to the various attributes of the data are associated, acquire a hash value of the original data as an original hash value using the hash function, which is selected, and store the original hash value and a hash function identification information on the blockchain, the hash function identification information identifying the hash function selected.

Hereinafter, an embodiment of the present disclosure will be described with reference to the drawings.

A data management system 1 of the present disclosure shown in FIG. 1 is a system that manages various data related to a target each possessed by multiple business entities 10 participating in a network NW while making the various data mutually available among the business entities 10. As an example, when the target is a vehicle, the business entities 10 such as a vehicle maintenance company, an automobile insurance company, a vehicle manufacturer, and a used car purchaser participate in a network NW. In this case, each business entity 10 stores a data related to a vehicle in a storage device 3 managed by each business entity 10. More specifically, for example, a maintenance company may store, for each vehicle, a data related to vehicle maintenance such as a history of vehicle maintenance carried out by the maintenance company, exterior photographs, and vehicle inspection data. Also, an automobile insurance company may store insurance information such as a vehicle accident condition, insurance payment amount, and details of an insurance contract. Further, a vehicle manufacturer may store information about a vehicle, such as driving history of the vehicle and operating conditions of an engine and motor, in its own storage device 3.

As another example, when the target is a food product, a farmer, a logistics company, a food sales company and the like participate in a network NW as business entities 10. In this case, each business entity 10 stores a data related to a food product in a storage device 3 managed by each business entity 10. More specifically, for example, a farmer stores photographs of produced foodstuffs, production area information, and the like in the storage device 3 managed by itself. A logistics company stores a transportation data and the like in the storage device 3 managed by itself. In addition, in the present disclosure, a user who provides data to each business entity 10 is referred to as a data provider. A user who uses a data stored in the storage device 3 is referred to as a data user. The data provider or the data user is a member (an employee) of each business entity 10, for example. The data provider or the data user may be a person other than a member of the business entities 10 such as a vehicle owner and a consumer of agricultural products, and may be an individual or a group other than a participant of the data management system 1. The data stored in the storage device 3 of each business entity 10 is acquired via the network NW in response to a request from a data user and provided to the data user.

As shown in FIG. 1, each business entity 10 is connected to the network NW and includes a node 2 that constitutes a blockchain system and a storage device 3 that is independent of the blockchain system. The node 2 of each business entity is connected to the node 2 of other business entity 10 via the network NW so as to be able to communicate with each other. Although four business entities 10 are illustrated in FIG. 1, the number of business entities 10 constitutes the data management system 1 may be equal to two or more.

The data management system 1 manages a data related to a target stored in each storage device 3 of the multiple business entities 10. The data related to the target is a data having various data attributes such as image data, text data and the like, which are exchanged among the business entities 10. The data attribute is data format, data compression format, and the like.

Figure 2:
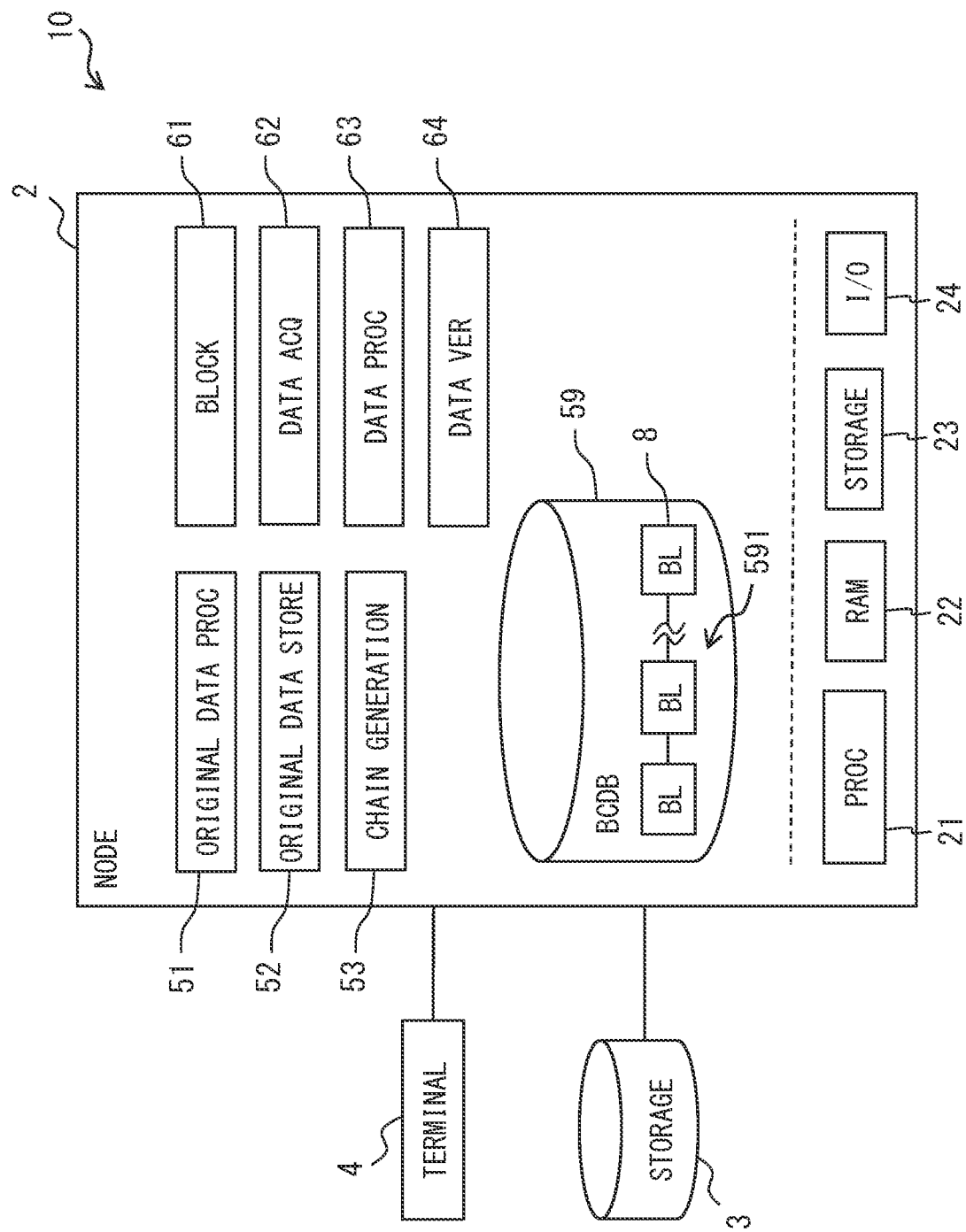
FIG. 2 is a block diagram conceptually showing a functional configuration of a node according to the embodiment of the present disclosure.

As shown in FIG. 2, the node 2 is mainly composed of a control circuit that includes a processor 21, a RAM 22, a storage 23, an input/output interface 24, and the like. The processor 21 is hardware for operational processing, which is coupled to the RAM 22. The processor 21 is capable of executing various programs through an access processing to the RAM 22. The input/output interface 24 is a circuit module for the node 2 to communicate with another node 2, a business terminal 4, and an external hash value calculation device 9, which will be described later. The storage 23 stores a data storage program for storing provided data and a data provision program for providing a storage data in response to a data provision request from a data user, as data management programs executed by the processor 21. In addition, the storage 23 stores authentication information that is given at the time of participation in the network NW and indicates that the node 2 is authorized to access data. Further, the storage 23 stores a hash function list 7 shown in FIG. 3.

The hash function list 7 stores information indicating various attributes of data and multiple hash functions corresponding to the various attributes of data in advance. In general, efficiency of a hash value calculation of data by a hash function varies depending on the attributes of the data. Therefore, in the hash function list 7, the hash function by which hash value calculation is efficient is associated with each of the attributes of data. Accordingly, by referring to the hash function list 7, it is possible to select an efficient hash function depending on the data attributes. That is, in the data management system 1 according to the present disclosure, the hash function list 7 is used to select the optimum hash function that matches the data attribute. When a hash function is selected from the hash function list 7, a hash function identification information 821 identifying the selected hash function is generated. The contents of the hash function list 7 may be updated when the hash function is updated, or a new hash function is developed.

Figure 3:
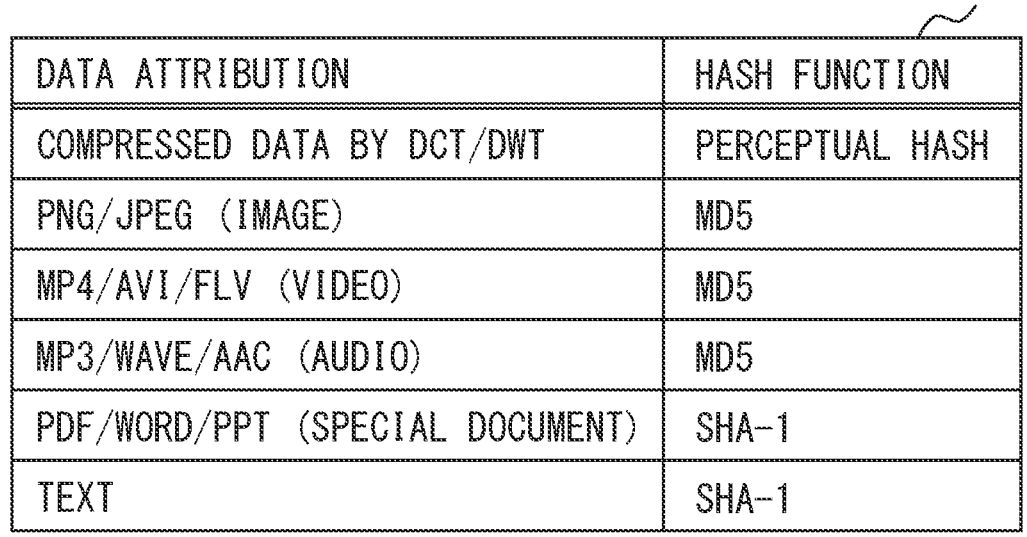
FIG. 3 is a table showing an example of a hash function list of the present disclosure.

As shown in FIG. 3, the hash function list 7 of the present embodiment includes a perceptual hash, which is a hash function corresponding to data compressed by a discrete cosine transform (DCT), a discrete wavelet transform (DWT), or the like. More specifically, the perceptual hashes include pHash, dHash, or the like. The compressed data may be data composed of feature amounts extracted from an original data. Further, in the hash function list 7, MD5 is specified as a hash function for PNG and JPEG, which are data formats of image data, MP4, AVI and FLV, which are data formats of video data, and MP3, WAVE and AAC, which are data formats of audio data. Further, in the hash function list 7, SHA-1 is specified as a hash function corresponding to PDF, WORD, PPT, which are data formats of special document data, and text data (TEXT). The correspondence relationship between the data attributes and the hash functions shown in FIG. 3 is an example, and the contents of the hash function list 7 are not limited to this example.

The storage device 3 stores the data related to the target that has been provided to the corresponding node 2, in association with a hash value of the data. Thereby, the storage device 3 is configured to be able to search for the storage data corresponding to an original hash value 822 by using the original hash value 822 as a search key.

A business terminal 4 is owned by each business entity 10 and used when storing or requesting data. The business terminal 4 is, for example, an electronic device such as a smartphone, a tablet terminal, and a computer such as a dedicated terminal. The business terminal 4 is connected to the node 2 of the business entity 10 and transmits data and the like to the node 2 in response to an operation by a data provider. In addition, the business terminal 4 transmits a data request query which requests provision of the data to the node 2 of the business entity 10 in response to an operation by a data user. The data request query includes information for extracting block information from a blockchain 591.

The external hash value calculation device 9 shown in FIG. 1 includes a processor and a memory and stores various hash functions. The external hash value calculation device 9 receives from the node 2, data and information identifying the selected hash function (corresponding to a hash function identification information 821). Then, the external hash value calculation device 9 calculates the hash value of the received data by using the specified hash function. Furthermore, the external hash value calculation device 9 transmits the calculated hash value to the node 2.

The node 2 functions as functional units such as an original data processing unit 51, an original data storage unit 52, and a chain generation unit 53 by executing the data storage program. In addition, the node 2 functions as functional units such as a block extraction unit 61, a storage data acquisition unit 62, an acquisition data processing unit 63, and a data verification unit 64 by executing the data provision program. The functions of these functional units will be described along with the description of the data storage processing and the data provision processing.

(Data Storage Processing)

Figure 4:
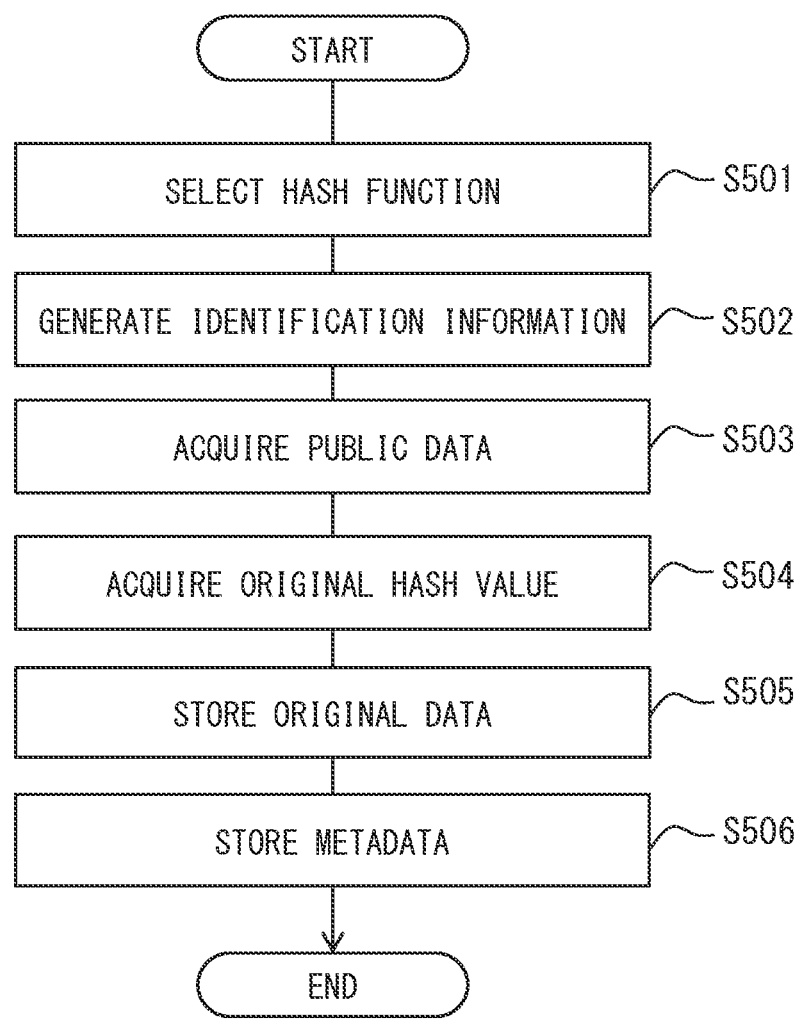
FIG. 4 is a flowchart illustrating a data storage processing according to the embodiment of the present disclosure.

As shown in FIG. 4, in the data storage processing, a processing for storing the provided data in the storage device 3 is performed. The data storage processing is triggered by data provision to the node 2 using the business terminal 4 operated by the data provider. In the following description, the provided data is referred to as an original data.

In the data storage processing shown in FIG. 4, for example, it is assumed that a vehicle maintenance company, which is the business entity 10, stores an exterior photograph of a vehicle in its own storage device 3 as a maintenance record. In this case, the data provider is an employee of the maintenance company, which is the business entity 10. Alternatively, it is conceivable that a farmer, which is the business entity 10, stores a photograph of produced food product in the storage device 3. In this case, the data provider is the farmer.

In S501, upon receiving data from the data provider via the business terminal 4, the original data processing unit 51 selects a hash function from the hash function list 7 based on the attribute of the provided original data. For example, if the original data is image data in JPEG format, "MD5" is selected as the hash function. In S502, the original data processing unit 51 generates a hash function identification information 821 that identifies the selected hash function. In S503, the original data processing unit 51 removes information related to privacy (hereinafter referred to as non-public data), such as personal information that can identify an individual and financial information such as a credit card number, from the original data, to obtain public data. The processing of S503 for obtaining the public data may be performed before the processing of S501. Further, in S504, the original data processing unit 51 acquires the hash value of the public data as an original hash value 822 by using the hash function identification information 821 generated in S502. Specifically, the original data processing unit 51 transmits the public data and the hash function identification information 821 generated in S502 to the external hash value calculation device 9. The external hash value calculation device 9 uses the hash function identified by the received hash function identification information 821 to calculate the hash value of the public data as the original hash value 822. For example, when the original data is image data in JPEG format, the external hash value calculation device 9 calculates the hash value of the public data using a hash function MD5. By transmitting the original hash value 822 calculated by the external hash value calculation device 9 to the node 2, the original data processing unit 51 acquires the original hash value 822.

Figure 5:
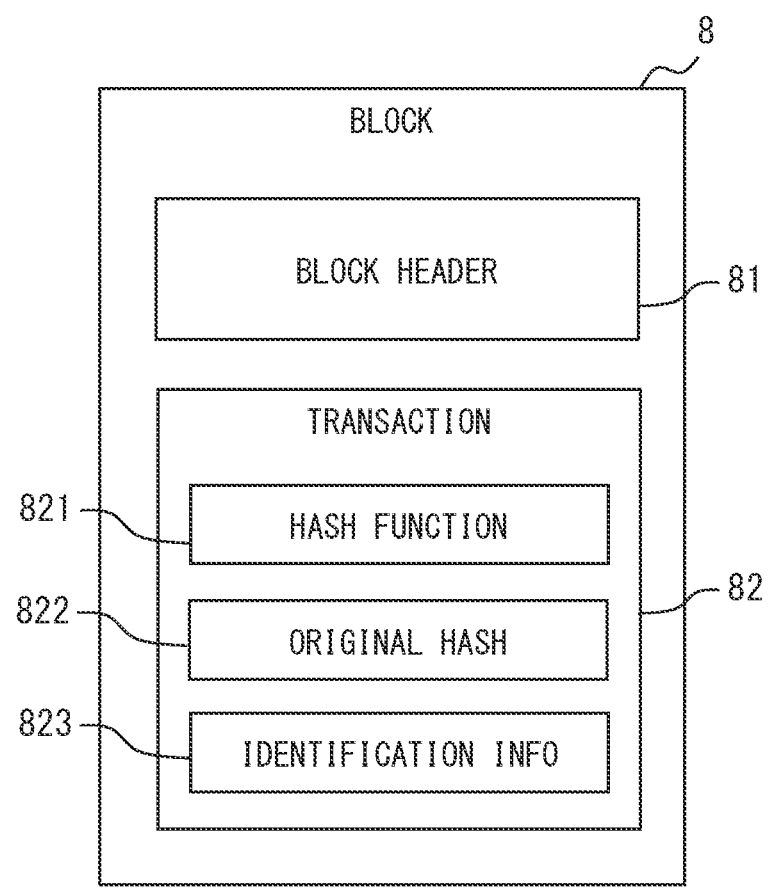
FIG. 5 is a diagram showing the details of blocks that make up a blockchain of the present disclosure.

In S505, the original data storage unit 52 stores the original data including the non-public data in association with the original hash value 822 acquired in S504 in the storage device 3 corresponding to the node 2. In S506, as shown in FIG. 5, the chain generation unit 53 generates a block 8 (see FIG. 5) in which the hash function identification information 821 generated in S502, the original hash value 822 acquired in S504 and metadata such as the storage node identification information 823 are included as a transaction information 82. The storage node identification information 823 is used to identify the business entity 10 (more specifically, the node 2) where the original data is stored when another business entity 10 uses the data. The generated block 8 is stored in a blockchain 591 within a blockchain database 59. Also, the block 8 includes data about itself as a block header 81. Here, the generated block 8 is provided to each node 2 through a known authentication processing by each node 2 connected to the network NW. Each node 2 provided with the authenticated block 8 stores the block 8 in the blockchain 591 stored in the blockchain database 59. The blockchain database 59 is a storage area provided within the storage 23. In this way, each node 2 shares the same blockchain 591.

According to the processing described above, the optimum hash function corresponding to the attribute of the original data is selected depending on the hash function list 7. Then, the hash value of the original data is calculated using the selected hash function. According to this, it is possible to efficiently calculate a hash value for various original data having different data attributes. Therefore, it is possible to save the original data in the storage device 3 in a brief time when storing data.

Also, the original data is stored in the storage device 3 while being associated with the original hash value 822. According to this, by using the original hash value 822 as a search key, it is possible to efficiently search and acquire the original data stored in the storage device 3.

Furthermore, the blockchain 591 shared by multiple nodes stores the original hash value 822 and the hash function identification information 821, which identifies the hash function used to calculate the original hash value 822. According to this, it is possible to store the original hash value 822 and the hash function identification information 821 in a state that is difficult to tamper with. At the time of data provision, it is possible to perform tampering verification using the same hash function as the hash function used in the calculation of the original hash value 822.

(Data Provision Processing)

Next, a data provision processing will be described with reference to FIG. 6. In the data provision processing, when a data user requests provision of data about a certain target, the data is extracted from the storage device 3 which stores the requested data, and provided it to the data user. Here, in the data provision processing, the multiple nodes 2 cooperate to identify the storage device 3 storing the requested data, and to extract and provide the data. The data provision processing is triggered by transmission of a data request query to the node 2 using the business terminal 4 by a data user. In the following description, the data corresponding to information requested by the data user is referred to as a request data.

Figure 6:
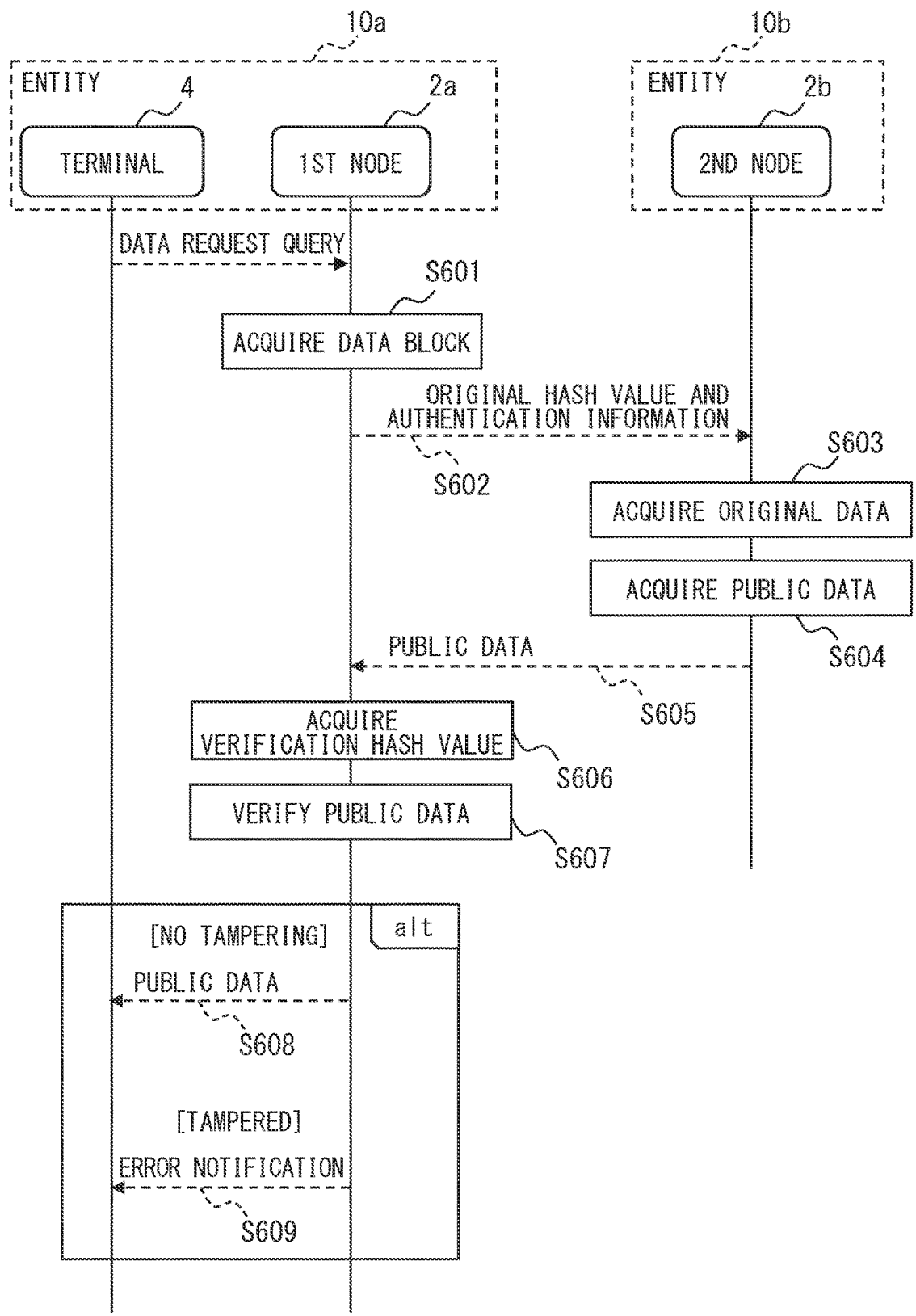
FIG. 6 is a sequence diagram showing a data provision processing according to the embodiment of the present disclosure.

The data provision processing shown in FIG. 6 describes, as an example, a case in which a certain business entity 10 (referred to as a first business entity 10a) requests the data stored in another business entity 10 (referred to as a second business entity 10b). More specifically, it is assumed that a used car purchaser, which is the first business entity 10a managing a first node 2a, requests to acquire an exterior photograph data, vehicle inspection information or the like of a vehicle stored in the storage device 3 of a vehicle maintenance company, which is the second business entity 10b. In this case, the data user corresponds to, for example, an employee of the used car purchaser. Alternatively, it is assumed that a grocery store such as a supermarket as the first business entity 10a requests to acquire photographs or the like of food products and food production area stored in the storage device 3 managed by a food producer such as a farmer as the second business entity 10b. In this case, the data user corresponds to, for example, an employee of the grocery store. In the following description, the node 2 of the first business entity 10a is referred to as a first node 2a, and the node 2 of the second business entity 10b is referred to as a second node 2b.

In S601, the block extraction unit 61 of the first node 2a extracts the transaction information 82 of the original data corresponding to the request data from the blockchain 591 using the data request query. The transaction information 82 includes the hash function identification information 821, the original hash value 822, and the storage node identification information 823, as shown in FIG. 5. In S602, the block extraction unit 61 of the first node 2a transmits the original hash value 822 acquired in S601 to the second node 2b identified from the storage node identification information 823, together with the authentication information indicating that the first node 2a itself is a node 2 which is authorized to access the data. In S603, the storage data acquisition unit 62 of the second node 2b acquires the original data corresponding to the request data from the storage device 3 by using the received original hash value 822 as a search key. In S604, the acquisition data processing unit 63 of the second node 2b acquires a public data by removing a non-public data from the original data acquired in S603. In S605, the acquired data processing unit 63 of the second node 2b transmits the public data acquired in S604 to the first node 2a. In S606, the data verification unit 64 of the first node 2a acquires the hash value of the public data as a verification hash value using the hash function identified by the hash function identification information 821 acquired in S601. Specifically, the data verification unit 64 of the first node 2a transmits the public data and the hash function identification information 821 acquired in S601 to the external hash value calculation device 9. The external hash value calculation device 9 uses the hash function identified by the received hash function identification information 821 to calculate the hash value of the public data as the verification hash value. The external hash value calculation device 9 transmits the verification hash value calculated to the first node 2a, and the data verification unit 64 acquires the verification hash value. In S607, the data verification unit 64 of the first node 2a compares the original hash value 822 acquired from the blockchain in S601 with the verification hash value acquired in S606 to determine whether or not the public data has been tampered with. When the original hash value 822 and the verification hash value match, the data verification unit 64 determines that the public data has not been tampered with. By contrast, when the original hash value 822 and the verification hash value are different, it is determined that the public data has been tampered with.

In S608 when it is determined that the public data has not been tampered with, the data verification unit 64 of the first node 2a transmits the public data to the business terminal 4 of the first business entity 10a. By contrast, in S609 when it is determined that the public data has been tampered with, the data verification unit 64 of the first node 2a transmits a data acquisition error notification to the business terminal 4 of the first business entity 10a.

According to the above processing, it is possible to provide the data stored in the storage device 3 corresponding to the second node 2b to the first node 2a, which is a node 2 different from the second node 2b. In addition, since the blockchain 591 is stored in a state that can be referenced by each node 2, the first node 2a can verify whether the acquired public data has been tampered with using the original hash value 822 and the hash function identification information 821 on the blockchain 591 with low tamper risk.

According to the data management system 1 of the present embodiment, the hash function identified by the hash function identification information 821 stored on the blockchain 591 is used to verify whether or not the acquired public data has been tampered with. According to this, it is possible to calculate a verification hash value using the efficient hash function same as when the data is stored. Furthermore, it becomes possible to efficiently verify tampering of the public data at the time of data provision, and to provide the data to the data user in a brief time.

According to the data management system 1 of the present embodiment, the external hash value calculation device 9 calculates the hash value of the data. According to this configuration, it is possible to reduce processing load on the node 2. Furthermore, even when the hash function is updated, by updating the hash function stored in the external hash value calculation device 9, it is possible to calculate the hash value using a common hash function. Therefore, even when the hash function list 7 stored in each node 2 is not synchronized, it is possible to use a common hash function when calculating the original hash value 822 and the verification hash value.

The above description of the embodiments of the present disclosure is not to be interpreted as limited to the above embodiments, but may be applied to various embodiments and combinations thereof to the extent not departing from the spirit of the present disclosure.

In the data provision processing according to the above embodiment, an example describes that the first node 2a and the second node 2b are different nodes 2. However, in the data provision processing of the present disclosure, the first node 2a and the second node 2b may be the same node 2.

The hash function list 7 of the above embodiment stores information indicating a hash function for each data attribute. However, the hash function list 7 of the present disclosure may store the hash function identification information 821.

In the above embodiment, each node 2 stores the hash function list 7. However, the present disclosure may allow the external hash value calculation device 9 to store the hash function list 7 instead of each node 2 storing the hash function list 7. In this case, each node 2 transmits only the public data to the external hash value calculation device 9. In this case, the external hash value calculation device 9 selects a hash function corresponding to the attribute of the public data transmitted from each node 2 from the hash function list 7, and calculates the hash value of the public data.

Figure 7:
FIG. 7 is a table showing another example of a hash function list according to a modified example of the present disclosure.

In the hash function list 7 shown in the above described embodiment (see FIG. 3), combinations of data attributes and hash functions are set so that hash value calculation is most efficient. However, the content of the hash function list 7 is not limited to this. For example, from the viewpoint of emphasizing robustness, the hash functions in the hash function list 7 may be changed. Specifically, as shown in FIG. 7, SHA-1 may be used as a hash function corresponding to data compressed by discrete cosine transform (DCT), discrete wavelet transform (DWT), or the like. Further, in the hash function list 7, SHA-256 may be used as a hash function for PNG and JPEG, which are data formats of image data, MP4, AVI and FLV, which are data formats of video data, and MP3, WAVE and AAC, which are data formats of audio data. Further, in the hash function list 7, SHA-512 may be used as a hash function corresponding to PDF, WORD, PPT, which are data formats of special document data, and text data.

Figure 8:
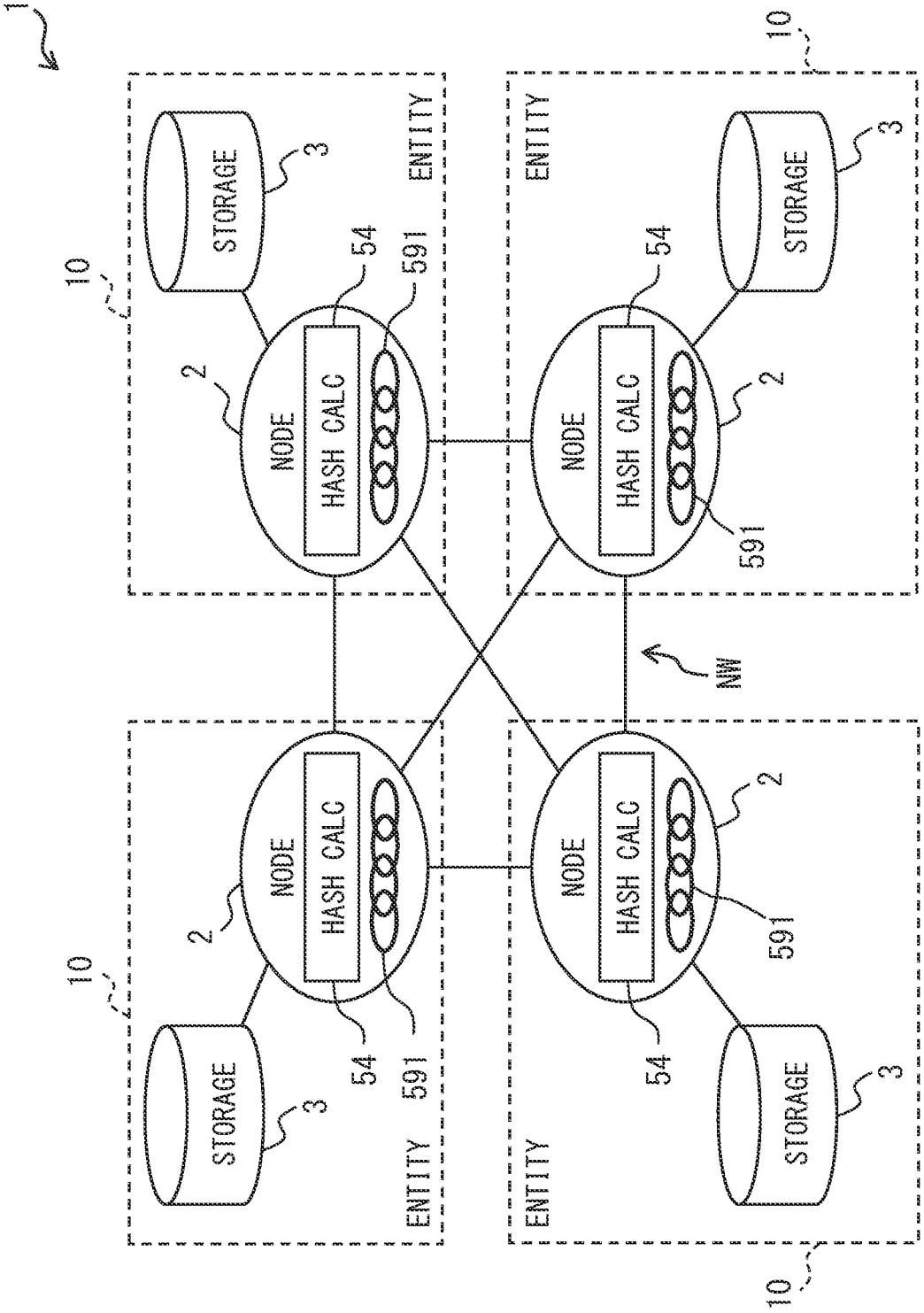
FIG. 8 is a diagram conceptually showing an overall data management system according to a modified example of the present disclosure.

In the data management system 1 according to the above embodiment, the external hash value calculation device 9 arranged outside the node 2 calculates the original hash value 822 and the verification hash value. However, it is not necessary to calculate the hash value outside the node 2. For example, as shown in FIG. 8, a hash value calculation unit 54 as a functional unit for calculating a hash value may be installed inside each node 2 without using the external hash value calculation device 9. In this case, the storage 23 stores multiple hash functions associated with various data attributes in the hash function list 7, and the hash value calculation unit 54 calculates the original hash value 822 and a verification hash value using the hash functions stored in the storage 23. According to this configuration, it is possible to avoid a situation in which the hash value cannot be calculated due to a problem in the external hash value calculation device 9 or a problem in the connection between the node 2 and the external hash value calculation device 9.

What is claimed is:

1. A data management system capable of verifying whether a storage data is tampered with, the data management system comprising:
   a storage device that is configured to store a data relating to a target as an original data; and
   at least one node that is configured to store a blockchain recording an information relating to the original data, wherein:
   the at least one node includes a processor and a memory;
   the memory stores a computer readable instruction; and
   when executed by the processor, the instruction causes the processor, when storing the original data, to
      select a hash function corresponding to an attribute of the original data from a hash function list in which various attributes of data and a plurality of hash functions corresponding to the various attributes of the data are associated,
      acquire a hash value of the original data as an original hash value using the hash function, which is selected, and
      store the original hash value and a hash function identification information on the blockchain, the hash function identification information identifying the hash function selected,
   wherein
   when executed by the processor, the instruction further causes the processor to
      acquire the original data corresponding to a request data, which is a data requested, from the storage device at a time of data request,
      acquire the original hash value of the original data corresponding to the request data and the hash function identification information from the blockchain,
      acquire, as a verification hash value, a hash value of the original data acquired from the storage device using the hash function identified by the hash function identification information,
      verify whether or not the original data acquired from the storage device is tampered with, by comparing the original hash value acquired from the blockchain and the verification hash value, and
      provide the original data when it is determined that the original data acquired from the storage device has not been tampered with.

2. The data management system according to claim 1, wherein:
   when executed by the processor, the instruction further causes the processor to
      store the original data in the storage device in association with the original hash value when storing the original data, and
      acquire the original data corresponding the request data from the storage device using the original hash value acquired from the blockchain when the request data is requested.

3. The data management system according to claim 1, wherein:
   the original data includes a non-public data; and
   when executed by the processor, the instruction further causes the processor to
      acquire the original hash value based on a public data obtained by removing the non-public data from the original data when storing the original data.

4. The data management system according to claim 3, wherein
   when executed by the processor, the instruction further causes the processor, when the request data is requested, to
      acquire a public data obtained by removing the non-public data from the original data which corresponds to the request data and is acquired from the storage device,
      acquire the verification hash value based on the public data acquired,
      verify whether or not the public data acquired is tampered with, by comparing the original hash value acquired from the blockchain and the verification hash value; and
      provide the public data acquired when it is determined that the public data acquired has not been tampered with.

5. The data management system according to claim 1, further comprising
   an external hash value calculation device that is configured to calculate a hash value of the original data using the hash function selected,
   wherein
   when executed by the processor, the instruction further causes the processor, when storing the original data, to acquire the hash value calculated by the external hash value calculation device as the original hash value.

6. The data management system according to claim 1, further comprising
   an external hash value calculation device that is configured to calculate a hash value of the original data acquired from the storage device using the hash function identified,
   wherein
   when executed by the processor, the instruction further causes the processor, when the request data is requested, to
      acquire the hash value calculated by the external hash value calculation device as the verification hash value.

7. A data management method capable of verifying whether or not a storage data is tampered with, the data management method comprising:
   storing a data relating to a target as an original data in a storage device;
   selecting a hash function corresponding to an attribute of the original data from a hash function list in which various attributes of data and a plurality of hash functions corresponding to the various attributes of the data are associated;

acquiring a hash value of the original data as an original hash value using the hash function, which is selected; and storing the original hash value and a hash function identification information on a blockchain, the hash function identification information identifying the hash function selected, wherein the data management method further comprises:

acquiring the original data corresponding to a request data, which is a data requested, from the storage device at a time of data request;

acquiring the original hash value of the original data corresponding to the request data and the hash function identification information from the blockchain;

acquiring, as a verification hash value, a hash value of the original data acquired from the storage device using the hash function identified by the hash function identification information;

verifying whether or not the original data acquired from the storage device is tampered with, by comparing the original hash value acquired from the blockchain and the verification hash value; and providing the original data when it is determined that the original data acquired from the storage device has not been tampered with.

8. A non-transitory computer readable storage medium storing a program including an instruction, when the instruction is executed by at least one processor, the instruction causing the at least one processor, when storing data, to:

store a data relating to a target as an original data in a storage device;

select a hash function corresponding to an attribute of the original data from a hash function list in which various attributes of data and a plurality of hash functions corresponding to the various attributes of the data are associated;

acquire a hash value of the original data as an original hash value using the hash function, which is selected; and store the original hash value and a hash function identification information on a blockchain, the hash function identification information identifying the hash function selected, wherein when the instruction is executed by the at least one processor, the instruction further causes the at least one processor to:

acquire the original data corresponding to a request data, which is a data requested, from the storage device at a time of data request;

acquire the original hash value of the original data corresponding to the request data and the hash function identification information from the blockchain;

acquire, as a verification hash value, a hash value of the original data acquired from the storage device using the hash function identified by the hash function identification information;

verify whether or not the original data acquired from the storage device is tampered with, by comparing the original hash value acquired from the blockchain and the verification hash value; and provide the original data when it is determined that the original data acquired from the storage device has not been tampered with.

* * * * *